United States Patent Office 3,532,706
Patented Oct. 6, 1970

3,532,706
N-(1-HALO-1-NITROALKYLTHIO)HYDANTOIN
Gustave K. Kohn and Joseph G. E. Fenyes, Berkeley, Calif., assignors to Chevron Research Company, San Francisco, Calif., a corporation of Delaware
No Drawing. Original application Sept. 7, 1965, Ser. No. 485,619, now Patent No. 3,468,905, dated Sept. 23, 1969. Divided and this application Dec. 4, 1968, Ser. No. 817,587
Int. Cl. C07d 49/32, 27/52, 51/30
U.S. Cl. 260—309.5                   6 Claims

ABSTRACT OF THE DISCLOSURE

N-(1-halo-1-nitroalkylthio) dicarboximides wherein the alkyl group contains 2 to 6 carbon atoms and the halogen is of atomic number 17 to 35. Typical dicarboximides are N-(1-chloro-1-nitroethylthio) phthalimide, N-(1-halo-1-nitropropylthio) - 5,5 - dimethyl hydantoin, N,N-di-(1-chloro-1-nitropropylthio) uracil and 1,1-bis-(1-chloro-1-nitropropylthio) parabanic acid. These carboximides are fungicidal.

CROSS-REFERENCE TO RELATED APPLICATION

This application is a divisional of copending application Ser. No. 485,619, filed Sept. 7, 1965, now U.S. Pat. 3,468,905.

This invention concerns a new class of dicarboximides and their use as biocides. More particularly, it relates to N-(1-halo-1-nitroalkylthio) dicarboximides and their use as fungicides.

The compounds of this invention are N-(1-halo-1-nitroalkylthio) compounds wherein the nitrogen is attached to two carbonyl groups. The carbonyl groups are in turn attached to a divalent moiety to form either a mono- or bicyclic dicarboximide.

Structurally, the compounds of this invention have the generic formula

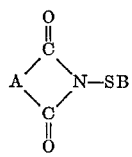

wherein A is one of the following groups:

(1) 1,2-hexacarbocyclic group having from 0-3 sites of olefinic (aromatic) unsaturation;

(2) $(R^1)_2$—C—NH— wherein $R^1$ is hydrogen or lower alkyl of from 1 to 6 carbons;

(3) $R^2$C=C—NSB; and (4) O=C—N—SB wherein $R^2$ is hydrogen or lower alkyl, i.e., from 1 to 6 carbons, and B is a 1-halo-1-nitroalkyl group in which the halogen is of atomic number 17 to 35 and the alkyl is of from 2 to 6 carbons, i.e., ethyl through hexyl.

The compounds in which A is hexacarbocyclic may be more explicitly described by the formula:

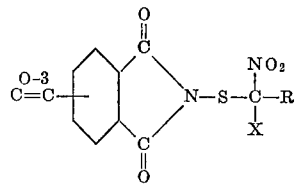

wherein X is halogen of atomic number 17 to 35, R is alkyl of from 1 to 5 carbons and the 1,2-cyclohexylene ring has from 0 to 3 sites of olefinic unsaturation, i.e., 1,2-phenylene, 1,2 - dihydrophenylene, 1,2 - tetrahydrophenylene and 1,2-hexahydrophenylene. Alternatively, the ring may be considered as phthalimide and derivatives thereof. In this case the ring could be phthalimide, dihydrophthalimide, tetrahydrophthalimide and hexahydrophthalimide. The ring may be unsubstituted or singly substituted with a chloro, bromo, nitro or alkyl group such as methyl, ethyl, butyl, amyl, etc.

The dihydro derivative, that is, dihydrophthalimide, may be 1,3-, 1,4-, 2,4-, 3,5-, etc. The tetrahydro derivative may be 1-, 2-, 3-, or 4-. Preferred compounds are phthalimide and Δ⁴-tetrahydrophthalimide.

Specific illustrations of hexacarboxylic compounds included within the above formula are:

N-(1-chloro-1-nitroethylthio)-phthalimide,
N-(1-bromo-1-nitrobutylthio)-phthalimide,
N-(1-chloro-1-nitropropylthio)-1,3-dihydrophthalimide,
N-(1-bromo-1-nitrohexylthio)-1,4-dihydrophthalimide,
N-(1-chloro-1-nitroamylthio)-cis-Δ⁴-tetrahydrophthalimide,
N-(1-chloro-1-nitroethylthio)-cis-Δ⁴-tetrahydrophthalimide,
N-(1-bromo-1-nitropropylthio)-3,5-dihydrophthalimide,
N-(1-chloro-1-nitrobutylthio)-cyclohexane-1,2-dicarboximide,
N-(1-bromo-1-nitroethylthio)-cyclohexane-1,2-dicarboximide,
4-nitro-N-(1-chloro-1-nitrobutylthio)-phthalimide,
3-methyl-N-(1-bromo-1-nitroethylthio)-cyclohexane-1,2-dicarboximide,
4-chloro-N-(1-bromo-1-nitropropylthio)-phthalimide,
3-bromo-N-(1-chloro-1-nitroamylthio)-cis-Δ⁴-tetrahydrophthalimide, etc.

The hydantoin compounds of this invention may be more rigorously represented by the formula

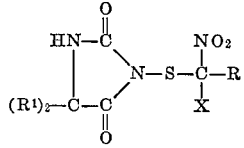

wherein X is halogen of atomic number 17 to 35, i.e., chlorine or bromine, R is alkyl of from 1 to 5 carbons and $R^1$ is hydrogen or lower alkyl. Included among the lower alkyl groups are methyl, ethyl, propyl, butyl, amyl and hexyl. Preferred compounds are the 3-(1-halo-1-nitroalkyl) hydantoins.

Illustrative examples of some of the hydantoin compounds included in this invention are:

3-(1-chloro-1-nitroethylthio) hydantoin,
3-(1-bromo-1-nitrobutylthio) hydantoin,
3-(1-chloro-1-nitrohexylthio) hydantoin,
3-(1-chloro-1-nitropropylthio)-5,5-dimethylhydantoin,
3-(1-bromo-1-nitroamylthio)-5-methylhydantoin,
3-(1-chloro-1-nitroethylthio)-5-ethylhydantoin,
3-(1-chloro-1-nitrobutylthio)-5-butylhydantoin,
3-(1-bromo-1-nitroethylthio)-5,5-dipropylhydantoin, etc.

Also, the pyrimidine compounds of this invention may be further defined by the structure

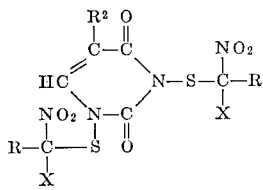

wherein X is halogen of atomic number 17 to 35, R is alkyl of from 1 to 6 carbons and $R^2$ is hydrogen or methyl. As derivatives of pyrimidine, these compounds may be termed 2,6-dioxypyrimidine or methyl-dioxypyrimidine, i.e., uracil or thymine.

Illustrative of the compounds in this grouping are: N,N' - di-(1 - chloro-1-nitroethylthio) uracil, N,N'-di-(1-bromo - 1 - nitrobutylthio) uracil, N,N - di-(1 - chloro-1-nitrohexylthio) uracil, N,N - di-(1-bromo-1-nitropropyl-thio) thymine, N,N - di-(1-chloro-1-nitroethylthio) thymine, N,N-di-(1-chloro-1-nitrohexylthio) thymine, etc.

Examples of the di-(1-halo-1-nitroalkylthio) substituted parabanic acids of this invention are 1,3-bis-(1-chloro-1-nitroethylthio) parabanic acid, 1,3-bis-(1-bromo-1-nitrobutylthio) parabanic acid, 1,3-bis-(1-chloro-1-nitrohexylthio) parabanic acid, etc.

The preparation of the unique N-(1-halo-1-nitroalkyl) dicarboximides of this invention may be carried out by reacting an alkali metal salt of the corresponding imide with a 1-halo-1-nitroalkylsulfenyl halide. The imide may be contained in a suitable inert medium, such as an aromatic solvent, e.g., benzene, toluene, etc., an alcohol, e.g., methanol, ethanol, etc., or water. Furthermore, the imide may be used directly in the form of its alkali metal salt or the salt may be formed in situ.

The solution or suspension of the alkali metal salt of the imide is vigorously stirred, preferably at low temperature while the sulfenyl halide is added. The sulfenyl halide may be contained in a suitable inert solvent, such as petroleum ether or mixed hexanes, if desired. After a sufficient reaction period the product is isolated by filtration or by stripping off the solvent. The product then may, if desired, be recrystallized from a suitable solvent, such as methanol or an aromatic solvent.

The 1-halo-1-nitroalkylsulfenyl halides used in the preparation of the compounds of this invention may be synthesized by reacting an alkali or alkaline earth metal salt of a primary nitroalkane with sulfur monochloride in the presence of an anhydrous, nonhydroxylic inert medium, such as ether, to form a bis-(1-nitroalkyl) disulfide and cleaving the disulfide with halogen, i.e., chlorine or bromine.

In specific illustration of the compounds of this invention and their method of preparation, the following examples are presented. These examples are offered as representative of the compounds falling within the scope of this invention and are not intended as limiting of the invention herein described.

EXAMPLE I

A 4.2-gm. portion of the potassium salt of phthalimide mixed with 50 mls. ether was charged to a vessel. To this mixture was added 4.0 gm. 1-chloro-1-nitroethylsulfenyl chloride in ether. This mixture was stirred for 15 minutes after which the solids were filtered from the mixture. The solids were washed with water and dried, to leave 3 gms. N-(1-chloro - 1 - nitroethylthio) phthalimide. This compound was observed as a white solid which melted at 110–112° C. Its analysis was: percent Cl: theory—12.4, found—12.28; percent S: theory—11.15, found—11.15.

EXAMPLE II

A 5.0-gm. portion of the sodium salt of cis-$\Delta^4$-tetrahydrophthalimide was charged to a vessel. To this mixture was added 5.45 gm. 1-chloro-1-nitropropylsulfenyl chloride in ether. The contents were stirred overnight and then filtered. The solids were washed with water and hexane and then dried. The product, N-(1-chloro-1-nitropropylthio)-cis-$\Delta^4$ - tetrahydrophthalimide, was observed as a solid which melted at 104–105° C. Its analysis was: percent Cl: theory—11.64, found—11.68; percent S: theory—10.52, found—10.30.

Using the methods described in Examples I and II, various other 1,2-hexacarbocyclic dicarboximides were prepared. The analyses of these compounds are contained in Table I.

TABLE I

| Compound | Analyses | | | |
|---|---|---|---|---|
| | Percent Cl | | Percent S | |
| | Theory | Found | Theory | Found |
| N-(1-chloro-1-nitropropylthio) phthalimide | 11.78 | 11.0 | 10.66 | 10.22 |
| N-(1-chloro-1-nitroethylthio)-cis-$\Delta^4$-tetrahydrophthalimide | 12.54 | 12.65 | 11.02 | 10.65 |

EXAMPLE III

A 3.0-gm. portion of the monopotassium salt of hydantoin in ether was charged to a vessel. To this suspension 3.75 gm. 1 - chloro-1-nitropropylsulfenyl chloride were added. The contents were stirred for 1 hour and allowed to stand for 3 days. The mixture was filtered and the solids were dried leaving 3.2 gms. 3-(1-chloro-1-nitropropylthio) hydantoin. It was observed as a white solid which melted at 157–160° C. with decomposition. Its analysis was: percent Cl: theory—14.0, found—14.33; percent S: theory—12.65, found—12.20.

EXAMPLE IV

A 5.0-gm. portion of the sodium salt of uracil in water was charged to a vessel. This mixture was cooled in an ice bath and a hexane solution of 8.5 gms. of 1-chloro-1-nitro-propylsulfenyl chloride and 4.3 g. NaOH were added while the mixture was blended in a Waring Blendor. A gluey solid was formed. The water was decanted and the solids were slurried with hexane, filtered and dried, leaving 3.1 gms. product. The product, N,N-di-(1-chloro-1-nitropropylthio) uracil melted at 129–133° C. Its analysis was: percent Cl: theory—16.91, found—14.55; percent S: theory—15.29, found—15.19.

EXAMPLE V

In the manner described in Example IV, N,N-di-(1-chloro-1-nitroethylthio) uracil was prepared. It melted at 145–146° C. with decomposition and had the following analysis: percent Cl: theory—19.12, found—18.63; percent S: theory—16.4, found—15.51.

EXAMPLE VI

A 5.0-gm. portion of the dipotassium salt of parabanic acid dissolved in ether was charged to a vessel. To this mixture was added 10.0 gm. 1 - chloro-1-nitropropylsulfenyl chloride. The contents were stirred for 1 hour and allowed to stand for 3 days. The solids were filtered off and the ether was stripped from the filtrate. The stripped filtrate was further distilled to 60° C. at 1.0 mm. Hg to give 4 gms. 1,3-di-(1-chloro-1-nitropropylthio) parabanic acid. This product was observed to be a viscous orange oil.

These new compounds find use in the control and killing of fungi. A number of the invention compounds were evaluated for fungicidal effectiveness by means of the mycelial drop test. This test is designed to measure the fungitoxic activity of fungicidal chemicals in terms of their degree of inhibition upon mycelial growth. Each compound to be tested was dissolved in acetone in dilutions as indicated in Table II. Paper discs previously inoculated by impregnation with equal amounts of particular fungus mycelium placed on potato dextrose agar medium were treated by applying a precise and equal volume of each of these fungicidal solutions to their center. Following treatment with the fungitoxic chemical, the discs were incubated along with inoculated but untreated control discs at ambient temperatures until such time that these untreated control discs were filled with mycelial growth. Activity of the fungitoxic chemical tested was determined immediately incubated in a moist room for 24 hours at 72–73° F. and a relative humidity of 95–97%, after which they were removed to a room with ambient temperatures in the range of 75–80° F. and a relative humidity of 85–90% for 12 days. At the end of this incubation period, disease readings were made by counting the local lesions on the primary leaves. These counts were compared with a similarly inoculated but unsprayed control series to determine the percentage of fungus control effected by the fungitoxic chemical. The results appear in Table IV.

TABLE II

| Compound | Concentration, p.p.m. | Fungus mycelium percent inhibition | | | |
|---|---|---|---|---|---|
| | | Pythium | Fusarium | Rhizoctonia | Verticillium |
| N-(1-chloro-1-nitroethylthio)phthalimide | 500 | | | 50 | 98 |
| N-(1-chloro-1-nitropropylthio)phthalimide | 500 | 97 | 98 | 97 | |
| N-(1-chloro-1-nitropropylthio)-cis-Δ⁴-tetrahydrophthalimide | 500 | 100 | 98 | | |
| N-(1-chloro-1-nitroethylthio)-cis-Δ⁴-tetrahydrophthalimide | 500 | 100 | 61 | | |
| 3-(1-chloro-1-nitropropylthio)hydantoin | 500 | 100 | 40 | | |
| N,N-di-(1-chloro-1-nitropropylthio)uracil | 500 | 100 | | | |
| 1,3-di-(1-chloro-1-nitropropylthio)parabanic acid | 500 | 100 | | 50 | 70 | by comparative measurements of radii of mycelial growth away from the edge of the disc in treated and untreated samples. From this comparison a percent inhibition of growth area was determined. The results of this test for various compounds of this invention on the particular fungus mycelium are indicated in Table II.

A number of the compounds were also tested for effectiveness against spores by means of "The Standard Spore Slide-Germination Method for Determining Fungicidal Activity," described in the American Phytopathological Society Journal, volume 33, pages 627–632 (1943). The method is designed to measure the fungitoxic activity of fungicidal chemicals, their activity being expressed in terms of percent inhibition of germination of fungus spores.

Each compound to be tested was dissolved in acetone to a concentration of 10 p.p.m. These solutions were then pipetted into the wells of depression slides and allowed to dry. The wells were filled with a spore suspension of chamber overnight. A group of 100 spores was examined and the number of spores germinated and not germinated was counted and recorded to show the biological activity in terms of the percentage germination inhibition. Table III reports the results of this testing.

TABLE III

| Compound | Organism percent inhibition | | |
|---|---|---|---|
| | Monolinia fructicola | Alternaria solani | Fusarium solani |
| N-(1-chloro-1-nitroethylthio) phthalimide | 98 | | 100 |
| N-(1-chloro-1-nitropropylthio) phthalimide | 100 | 61 | |
| N-(1-chloro-1-nitroethylthio)-cis-Δ⁴-tetrahydrophthalimide | 70 | | 97 |
| N-(1-chloro-1-nitropropylthio)-cis-Δ⁴-tetrahydrophthalimide | 97 | | 100 |
| 3-(1-chloro-1-nitropropylthio) hydantoin | 30 | | |
| N,N-di-(1-chloro-1-nitropropylthio) uracil | | | 100 |

Additionally, a similar sampling of the compounds of this invention were tested for fungicidal activity in vivo. In these tests, the chemicals were tested for the control of bean rust. According to this procedure, three replicate pinto bean plants growing in a standard University of California soil mix, in the 3-triplicate state and approximately 5 inches tall were sprayed at 15 p.s.i. with an acetone solution of each of the compounds to be tested at a concentration of 500 p.p.m. These suspensions were made uniform by means of an inert wetting agent and suitable filler. The plants were dried at ambient greenhouse temperatures and then inoculated with a spray of approximately 30,000 urediospores per ml. of *Uromeyces phaseoli typica*, the fungus causing bean rust. The plants were

TABLE IV

In vivo—Bean rust

Compound: Percent control
N-(1-chloro-1-nitroethylthio)phthalimide _____ 69
N-(1-chloro-1-nitropropylthio)phthalimide _____ 80
N - (1-chloro-1-nitroethylthio) - cis - Δ⁴ - tetrahydrophthalimide _____ 88
N - (1-chloro-1-nitropropylthio) - cis - Δ⁴ - tetrahydrophthalimide _____ 85
3-(1-chloro-1-nitropropylthio)hydantoin _____ 98
N,N-di-(1-chloro-1-nitropropylthio)uracil _____ 53
1,3 - di - (1-chloro-1-nitropropylthio)parabanic acid _____ 96

Aside from the specific formulation and application of the class of compounds of the invention as represented by the foregoing tests, these compounds may be dispsered in or upon other inert liquid and solid carriers, such as inert clay, xylenes, etc. The solid carriers may be in the form of a dust, or used in conjunction with a suitable wetting agent to form a wettable powder. The fungitoxic compounds of the invention may also be formulated with other solvents, dispersing agents, or emulsifying agents.

Further, these compounds may not only be applied alone or in mixtures with other compounds of the disclosed class but may also be used in combination with other active toxicants in the formulation of fungicidal compositions.

The compounds may be applied to any environmental area which is a host to fungus or suceptible to fungus attack. For example, the fungicidal compositions may be sprayed or otherwise applied directly to a plant or other host, may be applied to the plant seed, sprayed upon the soil or other plant environment, or used in similar ways so as to effect the control of fungus and fungus diseases.

As will be evident to those skilled in the art, various modifications on this invention can be made or followed in the light of the foregoing disclosure and discussion,

What is claimed is:
1. Compound of the formula

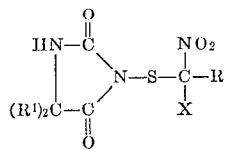

wherein R is alkyl of 1 to 5 carbon atoms, X is halogen of atomic number 17 to 35 and $R^1$ is hydrogen or lower alkyl.

2. A compound of claim 1 wherein $R^1$ is hydrogen.

3. A compound of claim 1 wherein R is methyl, ethyl, propyl or amyl and $R^1$ is hydrogen.

4. A compound of claim 1 wherein $R^1$ is methyl.

5. A compound of claim 1 wherein one $R^1$ is hydrogen and the other is methyl, ethyl or butyl.

6. 3-(1-chloro-1-nitroalkylthio)hydantoin wherein the alkyl is of 2 to 6 cabron atoms.

References Cited

UNITED STATES PATENTS

| | | | |
|---|---|---|---|
| 2,553,775 | 5/1951 | Hawley et al. | 260—309.5 |
| 3,178,447 | 4/1965 | Kohn | 260—309.5 |

NATALIE TROUSOF, Primary Examiner

U.S. Cl. X.R.

424—273